US 9,966,887 B2

(12) United States Patent
Lu

(10) Patent No.: US 9,966,887 B2
(45) Date of Patent: May 8, 2018

(54) BLDC ZERO CROSSING WITH BEMF, GATING, AND TRI-STATE DETECT CIRCUITRY

(71) Applicant: TEXAS INSTRUMENTS INCORPORATED, Dallas, TX (US)

(72) Inventor: Yisong Lu, Shrewsbury, MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days. days.

(21) Appl. No.: 15/182,126

(22) Filed: Jun. 14, 2016

(65) Prior Publication Data

US 2016/0294310 A1 Oct. 6, 2016

Related U.S. Application Data

(62) Division of application No. 14/025,057, filed on Sep. 12, 2013, now Pat. No. 9,397,594.

(51) Int. Cl.
*H02P 6/00* (2016.01)
*H02P 6/182* (2016.01)
*H02P 27/08* (2006.01)

(52) U.S. Cl.
CPC .............. *H02P 6/182* (2013.01); *H02P 27/08* (2013.01)

(58) Field of Classification Search
CPC ............. H02P 6/182; H02P 6/147; H02P 6/18
USPC ................................... 318/400.35
See application file for complete search history.

(56) References Cited

U.S. PATENT DOCUMENTS

| 5,451,832 | A | * | 9/1995 | Cameron | ................. | H02P 6/24 |
| | | | | | | 318/375 |
| 5,455,885 | A | * | 10/1995 | Cameron | ................. | H02P 6/21 |
| | | | | | | 318/771 |
| 5,909,095 | A | | 6/1999 | Sakti et al. | | |
| 6,005,320 | A | | 12/1999 | Kim et al. | | |
| 8,054,023 | B2 | | 11/2011 | Cassiano et al. | | |
| 2006/0066280 | A1 | | 3/2006 | Bhaumik et al. | | |
| 2008/0297081 | A1 | * | 12/2008 | Morita | ................. | H02P 6/182 |
| | | | | | | 318/400.11 |
| 2011/0279069 | A1 | * | 11/2011 | Murata | ................. | H02P 25/06 |
| | | | | | | 318/128 |
| 2013/0002180 | A1 | * | 1/2013 | Murata | ................. | H02P 6/182 |
| | | | | | | 318/400.42 |

OTHER PUBLICATIONS

"Back EMF Detection During PWM on Time by ST7MC", AN2030 Application Note, Rev 2, 13 pages, STMicroelectronics, 2007.
Matsui et al, "Brushless DC Motor Control without Position and Speed Sensors", 6 pages, IEEE, 1990.

* cited by examiner

*Primary Examiner* — Bickey Dhakal
(74) *Attorney, Agent, or Firm* — Lawrence J. Bassuk; Charles A. Brill; Frank D. Cimino

(57) ABSTRACT

A back electromotive force (BEMF) zero cross may be detected in a brushless direct current (BLDC) motor that is controlled by pulse width modulation (PWM). A phase input of the BLDC motor is tri-stated during PWM periods in which the phase input conducts motor drive current, and the tri-stating of the phase input is used to determine whether a BEMF zero cross has occurred in the BLDC motor.

7 Claims, 5 Drawing Sheets

BLDC ZERO CROSSING WITH BEMF, GATING, AND TRI-STATE DETECT CIRCUITRY

This application is a Divisional of prior application Ser. No. 14/025,057, filed Sep. 12, 2013, now U.S. Pat. No. 9,397,594, issued Jul. 19, 2016;

FIELD

The present work relates generally to controlling brushless direct current (BLDC) motors and, more particularly, to monitoring back electromotive force (BEMF) in BLDC motors.

BACKGROUND

Monitoring BEMF is a key factor in controlling BLDC motors. The zero cross point of the BEMF provides an indication of the rotor position. FIG. 1 diagrammatically illustrates a typical conventional example of a BLDC motor apparatus. The U, V and W phase inputs of the BLDC motor 13 are driven by an arrangement of drive transistors 12. A sinusoidal controller 11 provides control signals 14-19 for the drive transistor arrangement. A BEMF zero cross determiner 10 determines the BEMF zero cross point based on available feedback information. When a BEMF zero cross occurs, the determiner 10 provides a zero cross indication to an input 9 of the controller 11.

One conventional approach to BEMF determination is direct detection of BEMF using a window-opening method. In most BLDC motors, only two phases carry drive current at any time, and the third phase is floating. This opens a window to detect the BEMF in the floating winding. Window-opening has disadvantages such as relatively low efficiency and control torque distortion, and is typically ineffective in applications where noise is an important concern.

Another conventional approach is indirect estimation of BEMF using a windowless method. The windowless method makes calculations that are highly dependent on the accuracy with which the motor current is sensed. This dependency on accurate motor current sensing narrows the range of applications for the windowless method. For example, during low speed and low current operation, the motor current may be too low for accurate sensing. With core-less motors, which have very low inductance, high amplitude current ripple makes accurate current sensing even more difficult.

It is desirable in view of the foregoing to provide for BEMF zero cross determination in BLDC motors, while avoiding disadvantages associated with conventional approaches.

DETAILED DESCRIPTION

Figure 2:
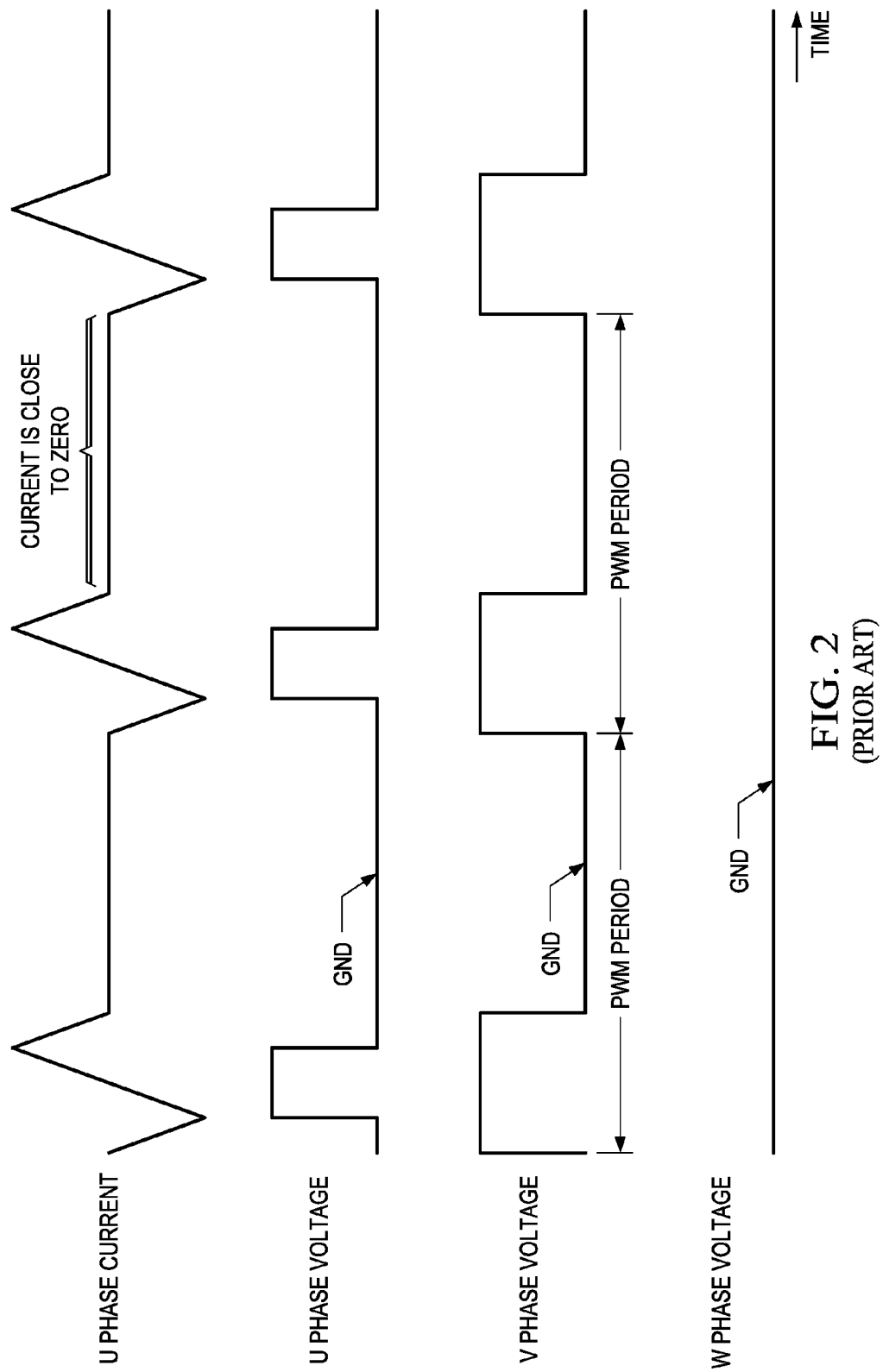
FIG. 2 is a timing diagram that illustrates conventional operation of a BLDC motor.

FIG. 2 is a timing diagram that illustrates a conventional example of low speed operation of a low inductance (e.g., core-less) BLDC motor. The U, V and W phases are controlled according to sinusoidal control that employs a series of pulse width modulation (PWM) periods as shown. The BEMF zero cross is expected in phase U when the voltage of phase W is zero. In the FIG. 2 example, the U and V phase voltages have approximately 5% and 10% duty cycles, respectively, relative to the PWM period length. The present work recognizes that the phase U current is approximately zero for about 90% of the PWM period, and exploits this characteristic for BEMF zero cross detection.

Figure 3:
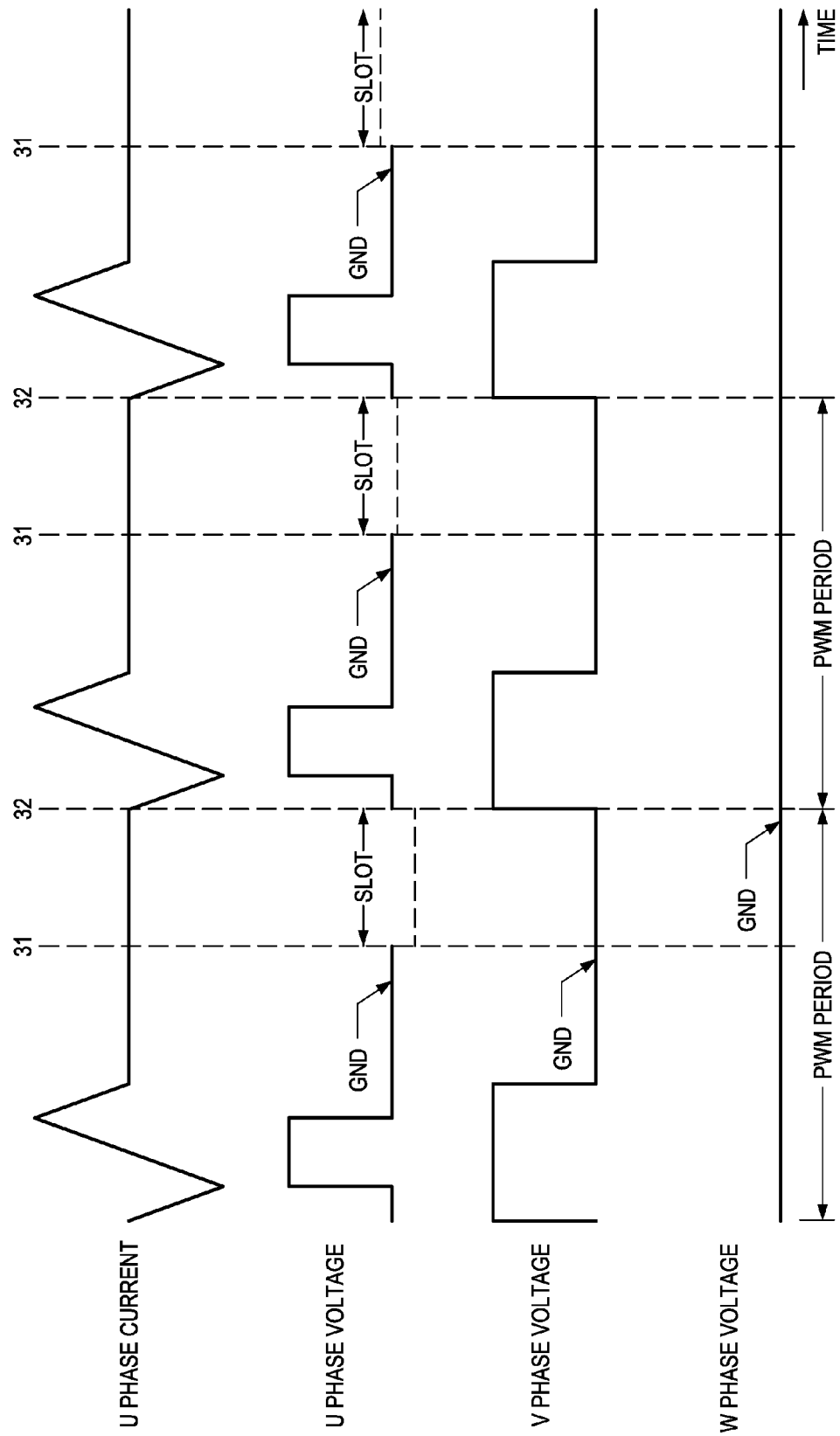
FIG. 3 is a timing diagram that illustrates principles of the present work applied with respect to the operation shown in FIG. 2.

FIG. 3 is a timing diagram that illustrates principles of the present work applied with respect to the example operation of FIG. 2. Phase U is tri-stated temporarily during each PWM period. The resulting voltage on floating phase U (shown by broken line) may then be compared to the motor ground (GND) to detect the BEMF zero cross point directly. That is, from one PWM period to the next, if the voltage on floating phase U crosses from above/below GND to below/above GND, this indicates a BEMF zero cross. The temporal duration of the phase U tri-stating is designated as a "slot" in FIG. 3. In each PWM period, the slot begins approximately at a mid-point 31 of the period, and ends at a point 32 before the period ends, that is, before the (10% duty cycle) phase V voltage is driven high. Because the phase U current is near zero for almost all of the PWM period, it will be understood that various embodiments use various temporal configurations of the slot (i.e., various combinations of slot length and slot location).

Figure 1:
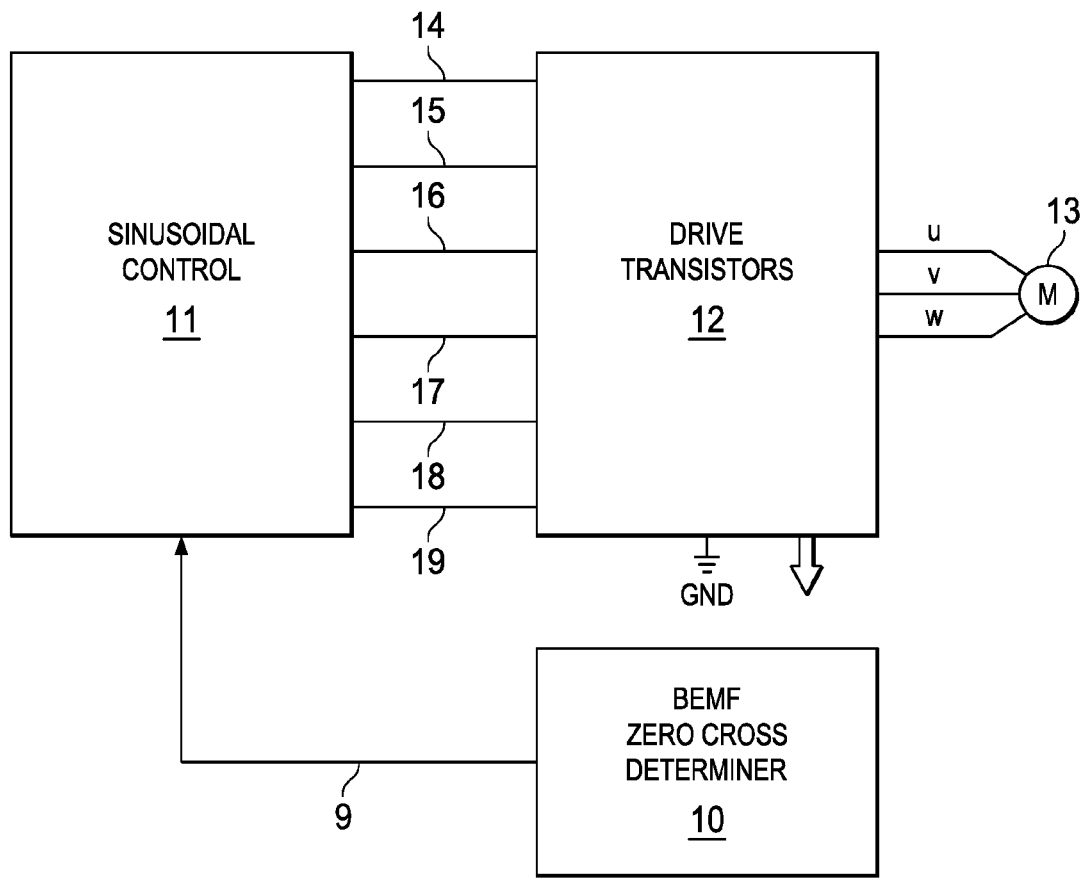
FIG. 1 diagrammatically illustrates an example of a BLDC motor apparatus according to the prior art.
Figure 4:
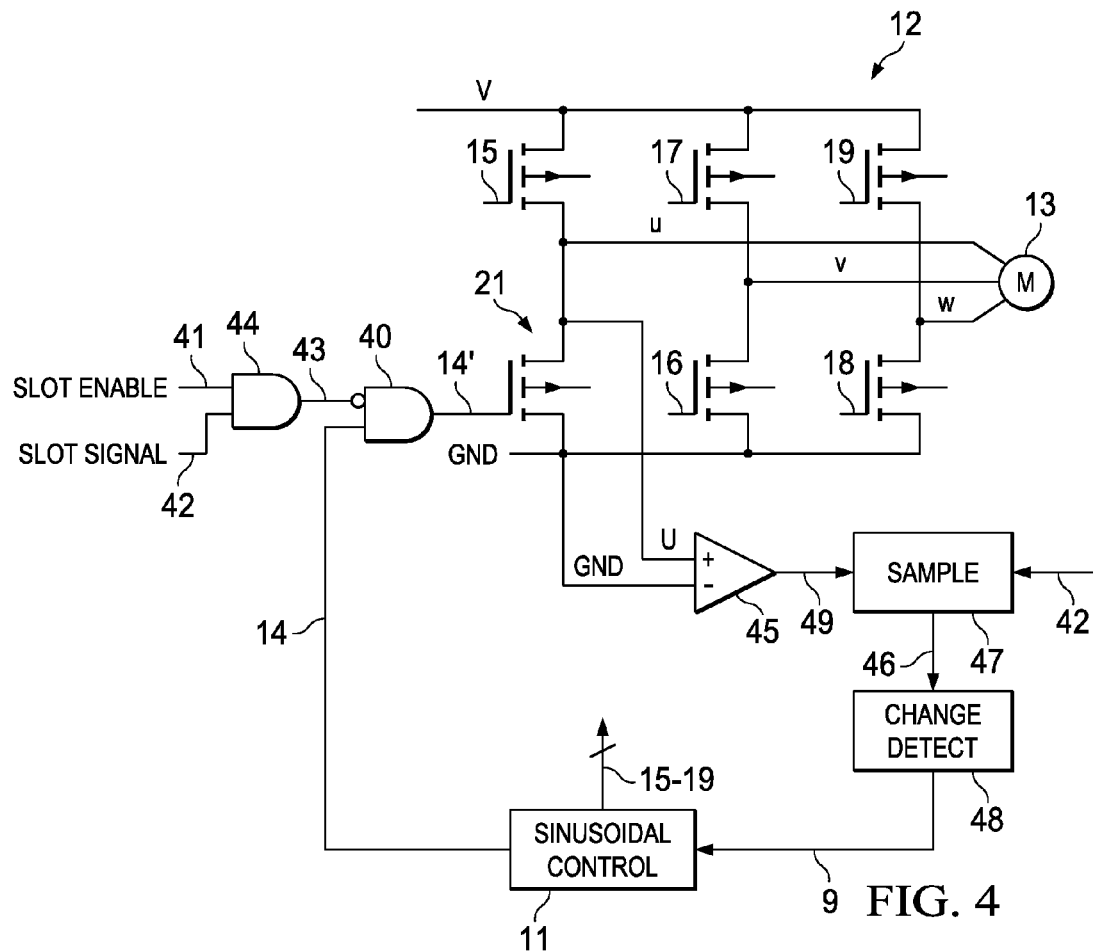
FIG. 4 diagrammatically illustrates a BLDC motor apparatus according to example embodiments of the present work.

FIG. 4 diagrammatically illustrates a BLDC motor apparatus according to example embodiments of the present work. The apparatus of FIG. 4 is capable of the above-described operation shown in FIG. 3. In some embodiments, the apparatus includes a controller 11, drive transistor arrangement 12 and BLDC motor 13 such as described above and shown in FIG. 1. The apparatus further includes a tri-state controller shown at 40-44, and a zero cross determiner shown at 45-49. The tri-state controller includes an AND gate 40 having an input driven by the control signal 14 that normally controls transistor 21 of the drive transistor arrangement (see also FIG. 1). The other input of AND gate 40 is driven by the inverse of a signal 43 output from another AND gate 44 whose inputs are driven by a slot enable signal 41 and a slot signal 42.

Referencing also FIG. 3, in each PWM period, the slot signal 42 is active (high) from time 31 to time 32, and is otherwise inactive (low). The slot enable signal 41 is active (high) when a motor speed command of the BLDC motor apparatus is less than a predetermined threshold, e.g., 50% in some embodiments, and is otherwise inactive (low). For motor speed commands above the threshold, some embodiments use conventional techniques (e.g., the BEMF zero cross determiner 10 of FIG. 1) to determine the BEMF zero cross. When the slot enable signal 41 qualifies the slot signal 42 at AND gate 44, signal 43 goes high and the output 14' of the AND gate 40 is therefore driven low. This turns off transistor 21 to tri-state the phase U input of BLDC motor 13. Note that the aforementioned inversion of the output 43 of AND gate 44 results in a NAND gate between AND gate 40 and the signals 41 and 42.

The phase U motor input is coupled to one input of a comparator 45 whose other input is coupled to the motor ground GND, which serves as a reference voltage for the comparator 45. A sampler 47 samples the output 49 of comparator 45 while the phase U motor input is tri-stated (i.e., while the slot signal 42 is active). The comparator output 49 is a non-zero voltage only when the phase U voltage exceeds the reference voltage GND. Thus, in every PWM period, the sampler 47 receives a comparator output voltage (compare result), and produces either a sample value of 1, if the voltage is non-zero, or a sample value of 0, if the voltage is zero. The sampler 47 therefore outputs either a 1 or 0 sample value for every PWM period, resulting in a series of 1s and 0s at the sampler output 46. A change detector 48 receives this series of 1s and 0s, and detects 0-to-1 changes and 1-to-0 changes in the series. Any such change corresponds to a BEMF zero crossing, which change detector 48 signals to the input 9 of the controller 11.

Figure 5:
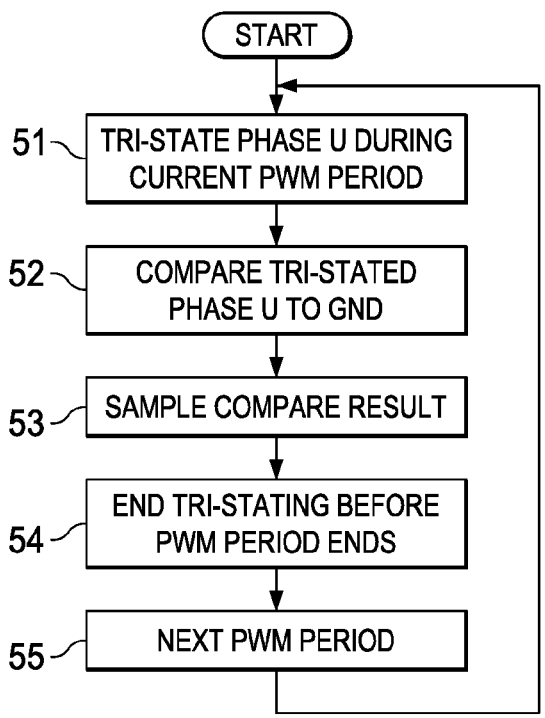
FIGS. 5 and 6 illustrate operations performed according to example embodiments of the present work.

FIG. 5 illustrates operations according to example embodiments of the present work. The apparatus of FIG. 4 is capable of performing the operations shown in FIG. 5. At 51, phase U is tri-stated during the current PWM period. At 52, the tri-stated phase U is compared to GND, and the compare result is sampled at 53. The tri-stating ends at 54 before the current PWM period ends. The operations at 51-54 are then repeated during the next PWM period, as indicated at 55.

Figure 6:
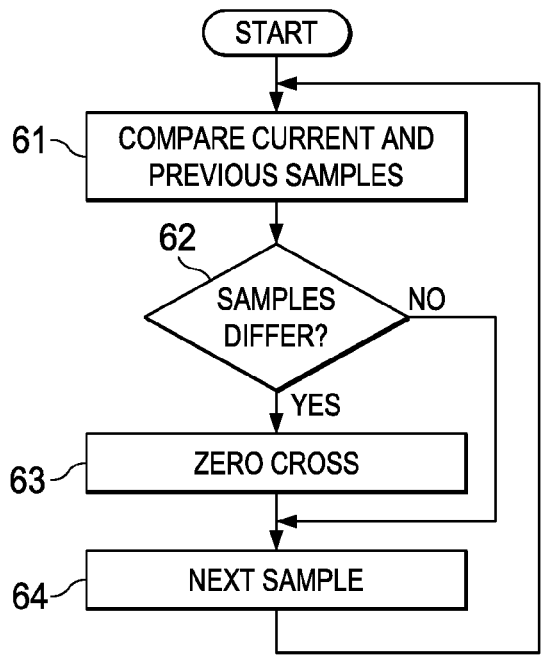

FIG. 6 illustrates further operations according to example embodiments of the present work. The change detector 48 of FIG. 4 is capable of performing the operations shown in FIG. 6. At 61, the current sample value (see also FIG. 5) is compared to the previous (i.e., immediately preceding) sample value. If the compared sample values are determined to differ from one another at 62, then a zero cross is indicated at 63. Otherwise, the next sample value is awaited at 64, after which the operations at 61-63 are repeated.

The BEMF zero cross detection described above relative to FIGS. 3-6 has, among others, the following advantages over prior art techniques: does not distort control torque; eliminates dependency on current sensing/measurement; eliminates calculations based on current sensing; eliminates dependency on position sensors (e.g., Hall elements); provides improved noise performance; provides improved speed stability; provides improved frequency jitter characteristics; provides improved zero cross detection at low motor speeds and low motor currents; and provides improved zero cross detection in core-less motors.

Although example embodiments of the present work have been described above in detail, this does not limit the scope of the work, which can be practiced in a variety of embodiments.

What is claimed is:

1. A circuit for a brushless direct current motor having first, second, and third phase inputs, comprising:
    drive circuitry having first, second, and third phase outputs, a high and a low control signal input coupled to the first phase output, a high and a low control signal input coupled to the second phase output, a high and a low control signal input coupled to the third phase output, a voltage input, and a reference voltage ground;
    sinusoidal control circuitry having first high and low control signal outputs coupled to the first high and low control signal inputs, having second high and low control signal outputs coupled to the second high and low control signal inputs, having third high and low control signal outputs coupled to the third high and low control signal inputs, and a sampler input;
    gating circuitry having a slot enable input, a slot signal input, an input coupled to the first low control signal output, and a gated first low control signal output coupled to the first low control signal input; and
    change detect circuitry having a reference voltage input coupled to the reference voltage ground, a first phase input coupled to the first phase output, an input coupled to the slot signal input, and having a sampler output coupled to the sampler input.

2. The circuit of claim 1 in which the gating circuitry includes:
    a first gate circuit having an input connected to the slot enable input, an input coupled to the slot signal input, and having a slot output; and
    a second gate having an inverted input connected to the slot output, an input coupled to the first low control signal output, and the gated first low control signal output coupled to the first low control signal input.

3. The circuit of claim 1 in which the change detect circuitry includes comparator circuitry having an input coupled to the first phase output, an input coupled to the reference voltage ground and a digital output, sample circuitry having an input connected to the digital output, an input coupled to the slot signal input, and a sample output, and a change detect circuit having a sample input coupled to the sample output.

4. The circuit of claim 1 in which the drive circuit includes:
    a first pair of transistors connected between the voltage input and the reference voltage ground, connected to the first phase output, and having the high and the low control signal inputs;
    a second pair of transistors connected between the voltage input and the reference voltage ground, connected to the second phase output, and having the high and low control signal inputs; and
    a third pair of transistors connected between the voltage input and the reference voltage ground, connected to the third phase output, and having the high and low control signal inputs.

5. A process of operating a brushless direct current motor from motor circuitry having first, second, and third pulse width modulated phase outputs providing respectively first, second, and third pulse width modulated phase signals from first, second, and third transistor pairs comprising:
    activating a slot signal to gating circuitry between every first pulse signal of the first pulse width modulated phase signals;
    activating a slot enable signal to the gating circuity upon receiving a speed command for the motor of less than 50%;
    tri-stating a transistor coupled to the gating circuitry and the first phase output in response to the activating the slot signal and the slot enable signal;
    comparing the tri-stated phase output to a reference voltage ground with comparator circuitry to produce a digital signal;
    sampling the digital signal in sampling circuitry while the slot signal is active;
    indicating from change circuitry a back EMF zero cross upon a change between a current and a previous sample of the digital signal; and
    indicating back EMF with other circuitry when receiving a speed command for the motor of other than less than 50%.

6. The process of claim 5 in which the pulse width modulation has a modulation period and includes beginning the tri-stating at a mid-point of a modulation period and ending the tri-stating before the modulation period ends.

7. The process of claim 5 including tri-stating and comparing only one of three phase outputs.

* * * * *